United States Patent [19]
Birns et al.

[11] Patent Number: 5,887,189
[45] Date of Patent: *Mar. 23, 1999

[54] MICROCONTROLLER SYSTEM FOR PERFORMING OPERATIONS OF MULTIPLE MICROCONTROLLERS

[75] Inventors: Neil E. Birns, Milpitas; Ori K. Mizrahi-Shalom, San Jose, both of Calif.

[73] Assignee: Philips Electronics North America Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 786,513

[22] Filed: Jan. 21, 1997

Related U.S. Application Data

[63] Continuation of Ser. No. 308,774, Sep. 19, 1994, abandoned.

[51] Int. Cl.⁶ .................................................. G06F 9/32
[52] U.S. Cl. .............................. 595/800.32; 395/800.01; 395/800.36; 711/202; 711/203; 711/212
[58] Field of Search .............................. 395/800, 800.01, 395/401, 427, 412, 413, 421.01, 421.07, 421.09, 421.1, 800.32, 800.36; 364/DIG. 1; 711/262, 203, 206, 209, 212

[56] References Cited

U.S. PATENT DOCUMENTS

| | | | |
|---|---|---|---|
| 4,484,274 | 11/1984 | Berenbaum et al. ................... | 395/678 |
| 4,495,571 | 1/1985 | Staplin, Jr. et al. ..................... | 395/293 |
| 4,985,848 | 1/1991 | Pfeiffer et al. ........................... | 395/164 |
| 5,036,458 | 7/1991 | Matsushima et al. ................... | 395/591 |
| 5,050,067 | 9/1991 | McLagan et al. ....................... | 395/678 |
| 5,062,034 | 10/1991 | Bakker .................................... | 395/500 |
| 5,159,688 | 10/1992 | Matsushima et al. .................. | 395/734 |
| 5,303,345 | 4/1994 | Iguchi et al. ....................... | 395/200.14 |
| 5,392,434 | 2/1995 | Bryant et al. ........................... | 395/732 |
| 5,530,673 | 6/1996 | Tobita et al. ....................... | 365/185.09 |
| 5,649,203 | 7/1997 | Sites ....................................... | 395/709 |
| 5,680,600 | 10/1997 | Childers et al. ........................ | 395/595 |

FOREIGN PATENT DOCUMENTS

| | | |
|---|---|---|
| 0272150 | 6/1988 | European Pat. Off. . |
| WO94/15287 | 7/1994 | WIPO . |

*Primary Examiner*—Larry D. Donaghue
*Assistant Examiner*—Dzung C. Nguyen
*Attorney, Agent, or Firm*—Peter Verdonk

[57] ABSTRACT

A microcontroller that provides an environment to run processes developed to run on several prior or low end generation machines with the independent register, status and data space needed for execution, that is, the resources of the microcontroller are a superset of the resources of the prior generation machine. The ability to limit one process from accessing the data space of another independent process is provided by data space segmentation controlled by upper order address bits not accessible by the independent processes. The separate workspaces are configured substantially like a workspace of a prior or low end generation machine allowing the microcontroller to perform the tasks of several independent prior or low end generation machines working in concert.

3 Claims, 6 Drawing Sheets

MICROCONTROLLER SYSTEM FOR PERFORMING OPERATIONS OF MULTIPLE MICROCONTROLLERS

CROSS REFERENCE TO RELATED APPLICATION

This a continuation of application Ser. No. 08/308,774, filed Sep. 19, 1994 now abandoned.

This application is related to U.S. applications entitled MICROCONTROLLER WITH A RECONFIGURABLE PROGRAM STATUS WORD by Wang et al., having U.S. Ser. No. 08/308,058, filed Sep. 19, 1994 and issued as U.S. Pat. No. 5,664,156; entitled A PROCESSOR WITH WORD-ALIGNED BRANCH TARGET IN A BYTE-ORIENTED INSTRUCTION SET by Mizrahi-Shalom et al, having U.S. Ser. No. 08/308,337, filed Sep. 16, 1994 U.S. Pat. No. 5,590,358; and entitled METHOD AND APPARATUS FOR FAST MICROCONTROLLER CONTEXT SWITCHING by Birns et al., having U.S. Ser. No. 08/308,770, filed Sep. 19, 1994 now abandoned; all incorporated by reference herein.

BACKGROUND OF THE INVENTION

1. Field of the Invention

The present invention is directed to providing a microcontroller system that is capable of performing tasks of several prior generation machines working in concert and, more particularly, to a single microcontroller that can multitask several different and independent programs of a prior or low end generation machine with the programs working in concert and as if running on physically different prior generation machines.

2. Description of the Related Art

To remain competitive in today's microcontroller market designers are being called upon to produce microcontrollers that are faster, more complex and which have a larger memory space. However, customers generally have a significant investment in programs written for smaller, less complex and slower low end and prior generation microcontrollers. As a result, there is a need for later or high end generations of microcontrollers to be able to execute the programs of the prior generation and yet not waste the improved capabilities of the current generation machine.

What is needed is a microcontroller that can execute programs running on several prior or low end generation machines without degrading the performance of the programs, as if they were running on physically separate machines and while protecting the independent integrity of the programs.

SUMMARY OF THE INVENTION

It is an object of the present invention to provide a microcontroller architecture having complete and independent work spaces which can each be allocated to different ones of the programs of low end or prior generation machines.

It is also an object of the present invention to provide each of several prior generation programs which would run on the prior generation machines with the hardware resources of the prior generation machine.

It is another object of the present invention to provide a microcontroller that can provide an environment to run several prior generation machine programs much faster than the low end or prior generation machine.

It is an additional object of the present invention to allow a single on-chip register space to be used by several low end generation programs in concert.

The above objects can be attained with a single microcontroller that provides several independent processes with all the independent registers, status flags and data space needed for execution. The microcontroller limits the ability of one process from accessing the data space of another independent process by providing data or workspace space segmentation. The separate workspaces are configured substantially like the workspace of a prior generation of machine allowing the microcontroller to perform the tasks of several independent prior generation machines working in concert.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
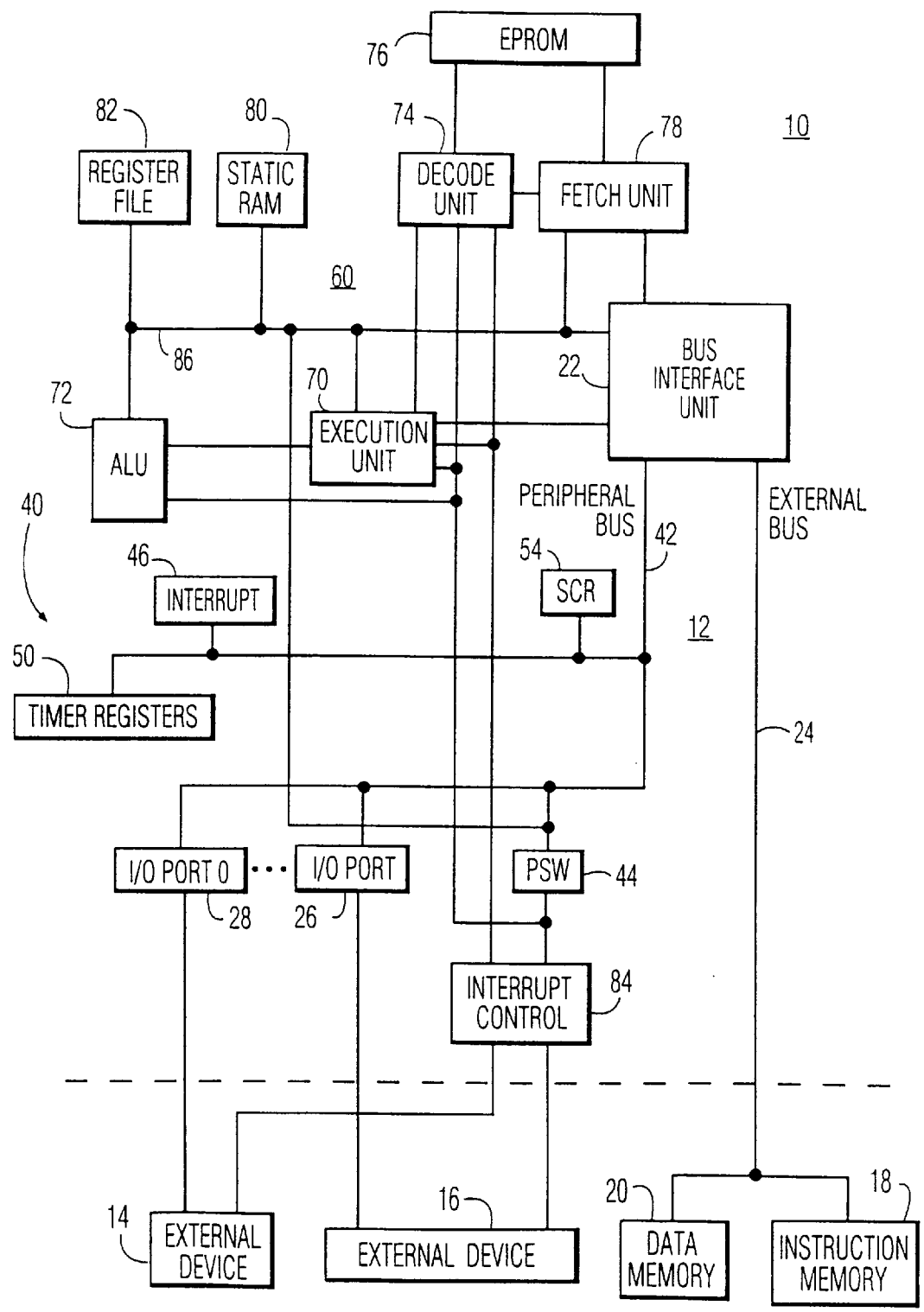
FIG. 1 illustrates a microcontroller of the present invention.

Philips Semiconductors of Sunnyvale, Calif. produces a microcontroller family of machines denominated the 80C51 family. This is a family of 8 bit microcontrollers which includes on-chip registers, on-chip data storage, on-chip program storage, external I/O lines and 64 kilobytes (Kb) of separate data and program memory address space. The present invention is designed to perform multitasking where several 80C51 programs can operate independently and in concert in a single microcontroller 12, as illustrated in FIG. 1. To provide this capability, the microcontroller divides the memory address space into 64 Kb pages and provides each page with general purpose registers, special purpose registers and an individual program status word (PSW) in a format of the 80C51 machine as needed by the application, procedure or program of a single 80C51 machine. Independence of the 80C51 procedures is provided by preventing the application programs from gaining access to data memory other than the page of the application. This capability of running plural 80C51 programs is provided while only providing a single physical program status word register which is larger and in a format different from the 80C51 PSW format and while only providing a limited size bank of physical registers. These features will be described in more detail below.

The architecture of the microcontroller system 10 of the present invention is illustrated in FIG. 1. This system 10 includes a 16 bit, single chip microcontroller 12 that performs 16 bit arithmetic operations and includes internal instruction and data storage. The microcontroller 12 supports external devices 14 and 16 and, through 24 bit external address. capability, supports sixteen megabytes (Mb) of external instruction storage or memory 18 and sixteen megabytes of external data storage or memory 20. The microcontroller 12 includes a bus interface unit 22 which communicates with the external memories 18 and 20 over an external bi-directional address and data bus 24. The microcontroller 12 communicates with the external devices 14 and 16 through I/O ports 26–28 which are addressable as special function registers (SFR) 40. The ports 26–28 as well as other special function registers are addressable over an internal peripheral bus 42 through a bus interface unit 22. external data memory 20 can also be accessed as off-chip memory mapped I/O through the I/O ports 26–28. The on-chip special function registers 40, some of which are bit addressable, also include a program status word (PSW) register 44 coupled to an interruption control unit 84 communicating with the external devices as well as an ALU 72, an execution unit 70 and a decode unit 74 for flag and general control. An interrupt register 46 and timer registers 50 are also provided. A system configuration register (SCR) 54 containing system configuration bits, which indicate whether the microcontroller 12 is in a compatibility mode (CM=1) compatible with 80C51 operations, is also provided. The program status word register is addressable over the peripheral bus 42 for general register operations and is also addressable over a connection to the internal bus 86 for other execution related operations. The bus interface unit 22 isolates the peripheral special function registers 40 from the microcontroller core 60. The core 60 includes a microcode programmable execution unit 70 which controls execution of instructions by an ALU 72 and The other units. The Instructions decoded by a decode unit 74 are fetched from an internal EPROM 76, which is part of the instruction memory space, or from the external instruction memory 18 by a fetch unit 78. Static RAM 80, which is part of the data memory space, as well as four banks of general purpose registers of a register file 82, are also available for instruction and data storage. Each of the banks can be dedicated to a different one of the 80C51 programs and access pathways to the correct bank can be automatically reconfigured for each 80C51 program. The four banks allow four 80C51 procedures to execute concurrently without moving register contents to and from data memory.

Figure 2:
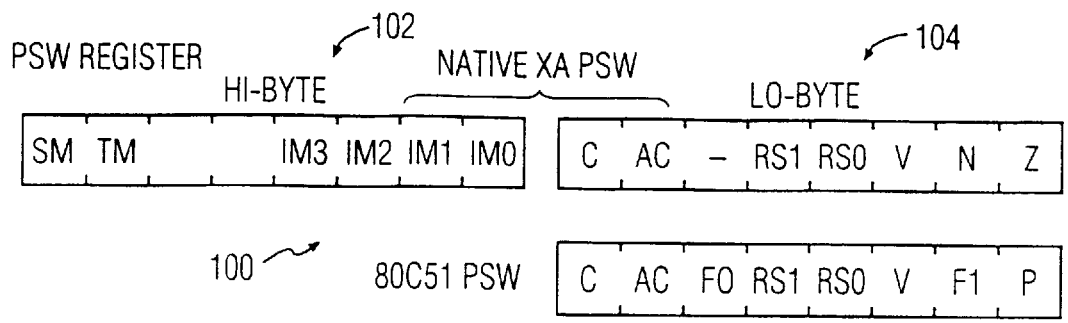
FIG. 2 depicts a program status word according to the present invention.

The program status word register 44 includes a program status word (PSW) 100, as illustrated in FIG. 2. The PSW register 44 is a word register in the bit-addressable SFR space 40. The high byte 102 is a protected half containing system/supervisor level flags. The second byte 104 contains all user level flags and functions as described below. A special byte 106 of the PSW also provided, is identical to the 80C51, and used in the compatibility mode. When necessary due to incompatibility of bit format between generation bit routing circuitry described in more detail in the Reconfigurable Program Status Word application previously mentioned, the special lyte 106 can be used to remap the bits.

As can be seen in FIG. 2, the C, AC, F0, F1, RS0, RS1, V and P bits of PSW 100 are also found in reconfigured byte 106 used by the 80C51 programs. C is a carry flag and the main function of this flag is to store the carry out of the most significant bit of an arithmetic operation. AC is auxiliary carry flag which is updated during arithmetic instructions with the carry out of the least significant nibble of the ALU 72. F0 and F1 are user definable flags and may be read and written by user programs. RS0 and RS1 are register bank select bits which identify one of, in this example, 4 groups or banks of registers R0 through R7 in the register file 82 which are active at a given time. The four register banks are addressable directly and indirectly as the bottom 32 bytes of data memory. By replacing the current PSW with a PSW associated with a particular 80C51 program, register bank access is automatically and quickly reconfigured for 80C51 programs. V is the overflow flag and is set by a two's complement arithmetic overflow condition during arithmetic instructions. P is parity flag and this bit shows the even parity for the current contents of register R8 (the register used for compatibility with the A register of the 80C51 microcontroller).

The following flags are not used by the 80C51 programs. SM is the system mode bit flag. The system mode is selected as the PSW is loaded from a vector at reset, can be changed during interrupt processing and is written by a return from interrupt (RETI) by popping the PSW. This is intended as an aid to multitasking applications and is used to prevent 80C51 applications from changing the high order data address bits by preventing such changes unless the microcontroller 12 is in the system mode (SM=1). TM is the trace-mode bit and is used to aid in the program development to allow instruction-by-instruction tracing. Z is a zero defect bit flag and after a data operation other than POP, PUSH or XCH, the Z flag is set to 1 if the operation returned a result of 0; otherwise the Z flag is cleared to 0. N is a negative operation indicator flag and after a data operation other than POP, PUSH or XCH, the N flag is set to 1 if the operation returned a result with the sign bit (MSB) set, otherwise the N flag is cleared to 0. New IM3 –IM0 bits are execution priority interrupt mask bits where these bits are used to identify the execution priority of the currently executing code. In the case of an interrupt, these IM bits will be set to the interrupt priority of the interrupt in progress. These bits can be also changed during interrupt processing. The microcontroller 12 supports saving and restoring of these bits during traps, interrupts, and return from interrupt, as well as providing lines from these bits through the interrupt control unit 84 to any interrupt control module outside of the core. Under microcode program and address logic control, writes to the IM bits are restricted to system mode code and cannot be performed by 80C51 applications. An additional flag exists in the microcontroller 12 that is not reflected in the PSW or directly visible to a running program. This is the accumulator zero flag (AZ). This is used to implement the 80C51 microcontroller JZ and JNZ instructions. 80C51 code directly tests the A (R8) register contents to execute these instructions. The microcontroller 12 updates the embedded AZ flag during any operation that alters R8, which is the register used to mimic the 80C51 microcontroller accumulator.

The system configuration register (SCR) 54 is a byte register that contains system configuration flags. This register 54 includes flags that are intended to be programmed once after reset and left alone thereafter. These flags therefore do not need to be saved during interrupts or other procedures. The CM flag is important to the preferred embodiment and is the compatibility mode flag. Several native features of the architecture of the microcontroller 12 must be modified slightly to provide complete compatibility for translated 80C51 code. These are: 1) Byte indirect mode for 80C51 registers R0 and R1. Indirect memory accesses that use pointer registers R0 and R1 in native mode (CM=0) will normally use word addresses like all other pointers. When the CM control bit is set to 1 (CM=1), indirect access instructions that are coded to use R0 or R1 as pointers are altered to use only a single byte address from byte register R0L or R0H (the equivalent of 80C51 R0 and R1) to allow translated 80C51 code to execute. The alteration occurs in the microcode program and is within the capability of one of skill in the art. In this mode, indirect addressing through R1 is not possible. 2) Register file overlap to memory. Translated 80C51 code may require the four register banks to appear in lower memory for indirect and direct addresses in some cases. The microcontroller 12 does not normally provide this overlap, but it is enabled by the compatibility mode. This same overlap will occur on every data memory segment when the compatibility mode is enabled, creating an 80C51 compatible memory map on each data segment (where each segment is identified by the data segment (DS) register contents).

Figure 3:
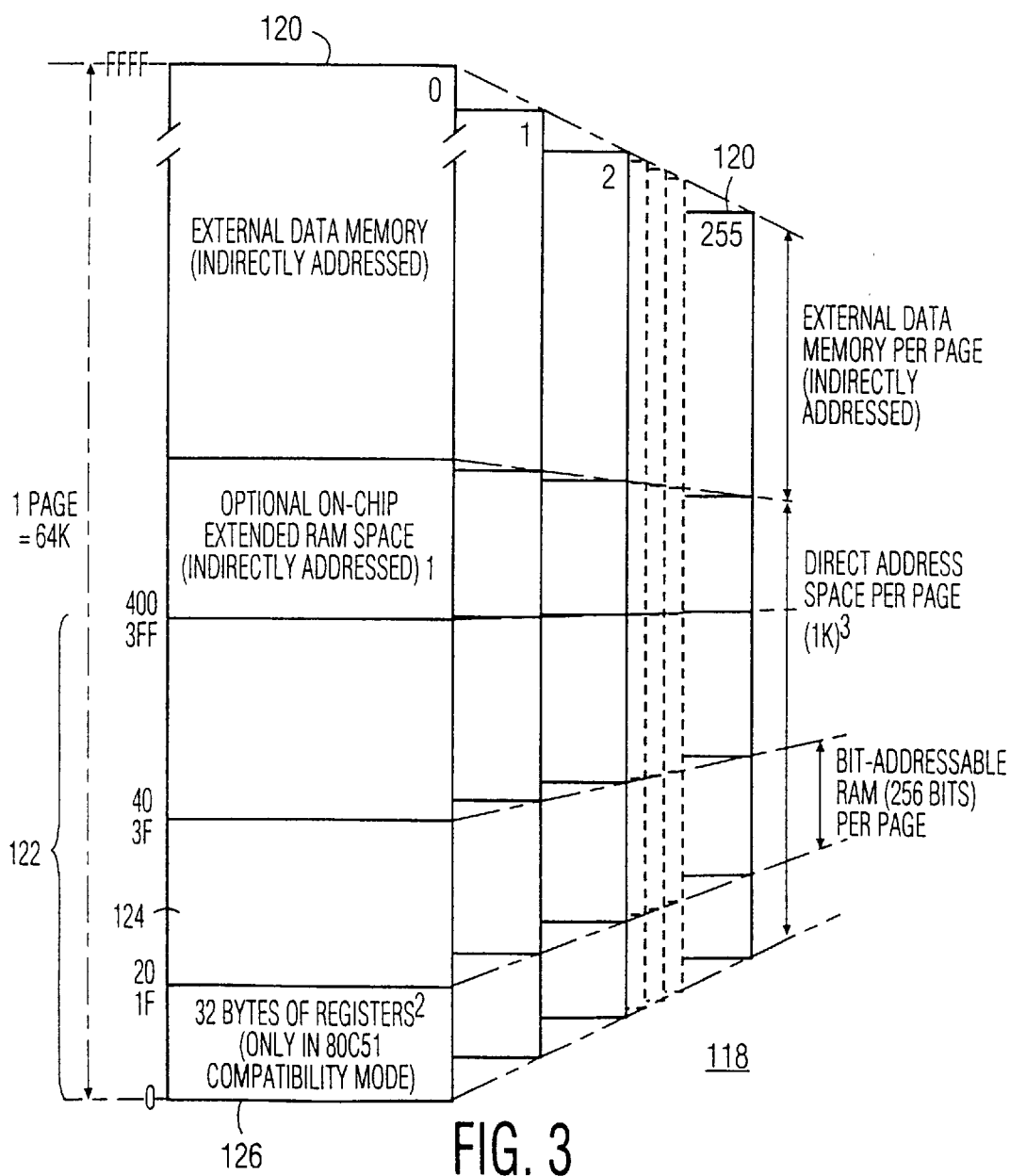
FIGS. 3–6 depict memory organization according to the present invention.
Figure 4:
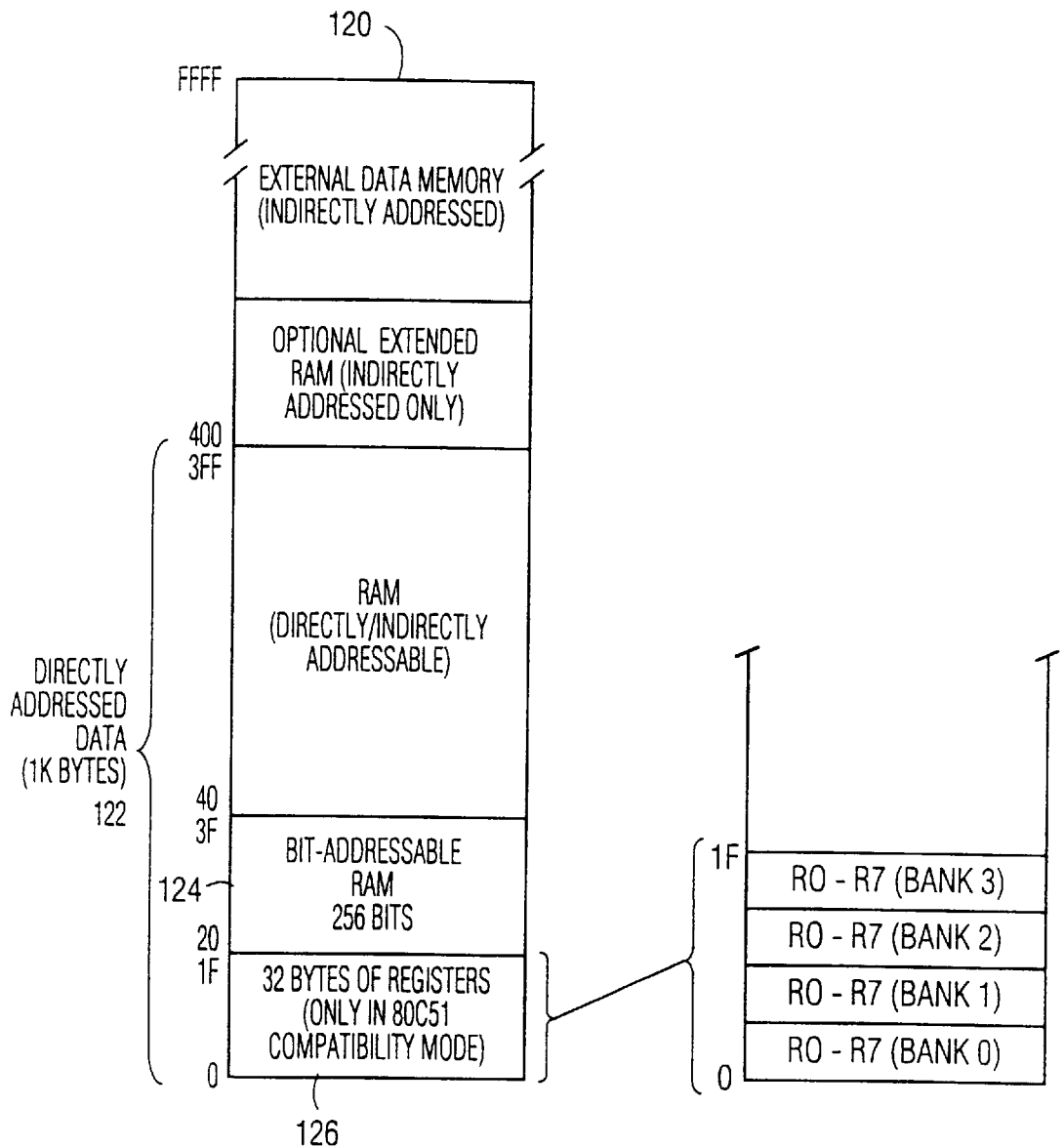
Figure 5:
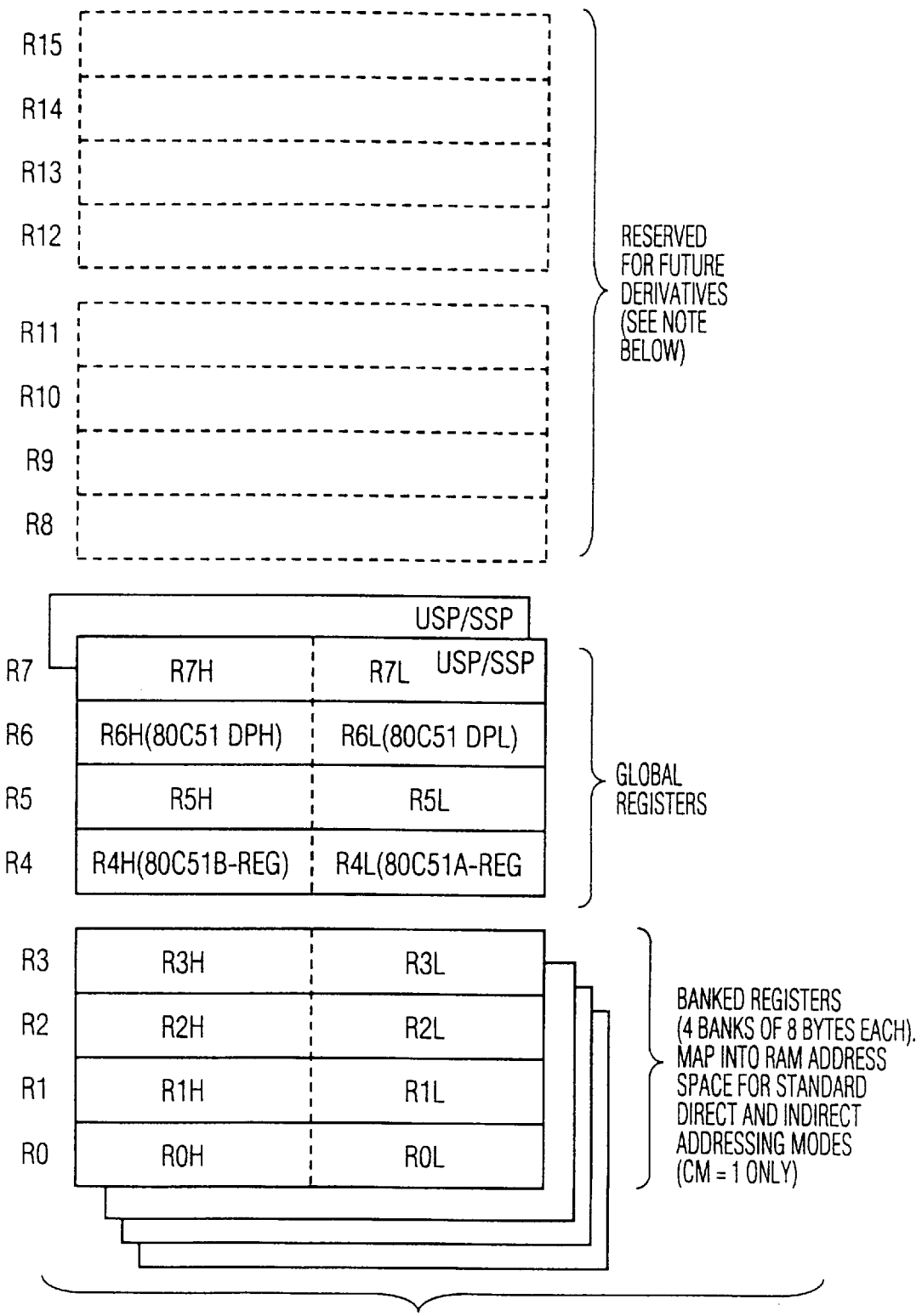
Figure 6:
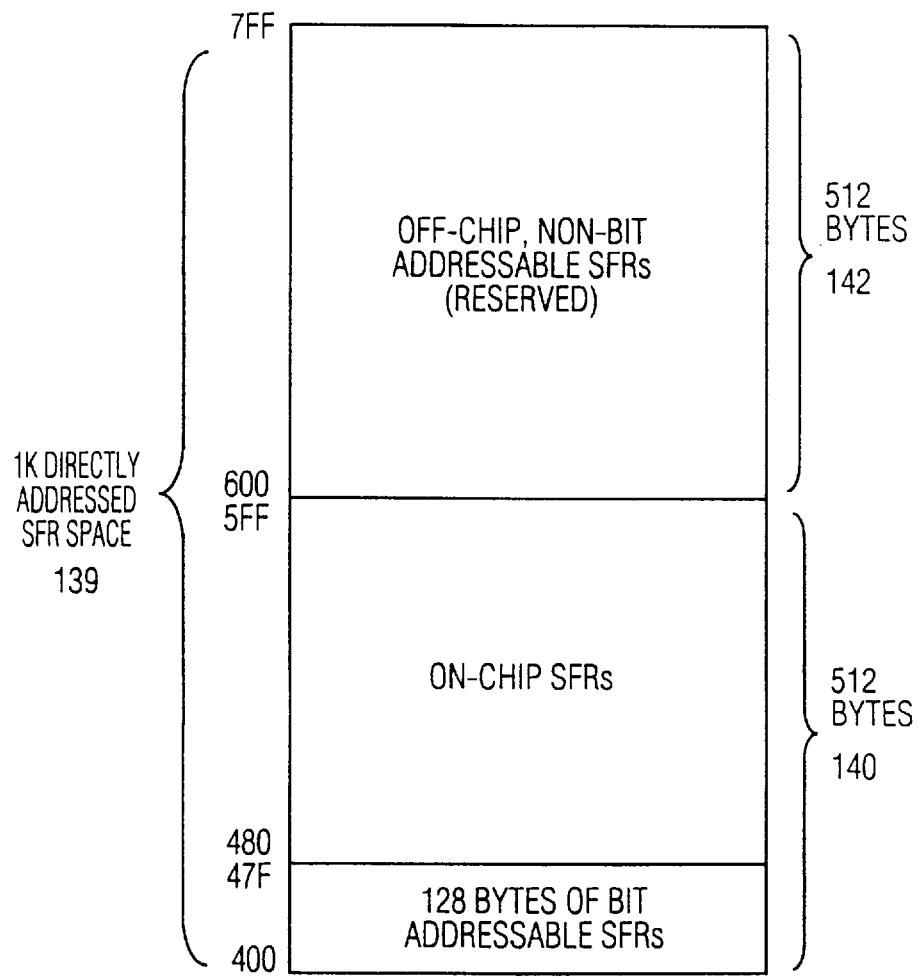

The microcontroller 12 includes a memory organization as illustrated in FIGS. 3, 4, 5 and 6 where FIG. 3 illustrates the organization into pages, FIG. 4 depicts the organization of a page in more detail, FIG. 5 depicts the register file in more detail and FIG. 6 illustrates the address range of the special function registers 40.

As previously discussed, the microcontroller 12 has separate address spaces for instruction memory and data memory. The logical separation of program and data memory allows faster access of data memory. All registers and on-chip memory are accessible (addressable) as bytes and/or words. Some dedicated data memory areas (SFR 40, RAM 80, and Register File 82) may also be accessed as bits (see FIG. 3). The term "data memory" refers to on-chip RAM 80, off-chip RAM 18 or off-chip memory mapped I/O. The microcontroller 12 supports up to 16 megabytes of the separate data and program memory (with 24-bit addresses). The data memory space 118 is segmented into 64K byte pages 120 suitable for 80C51 data storage, accessed via indirect addressing modes. Preferably, 512 bytes of data memory are implemented as on-chip RAM 80, but there is no architectural limitation on the minimum or maximum data memory that may be on-chip. The microcontroller 12 architecture allows up to 1K of direct addressing space 122 for data memory per page. To maintain backward compatibility with the 80C51 microcontroller architecture, in the compatibility mode (CM=1), the bottom 256 bytes of on-chip data memory are organized in the same manner as the standard 80C51. Only the SFR 40 which co-existed with the RAM in the 80C51, has been shifted to the dedicated on-chip SFR memory area in the microcontroller 12 (see FIG. 6). This SFR space 40 uses the upper 1K of addresses in the direct address field but is not part of the data memory map. There are four banks of registers R0 through R7 (see FIG. 4) starting at address 0 in the on-chip RAM (in the register file 82) and going up to address 1F hexadecimal. One of the four banks is selected as the active bank by the two bits RS0 and RS1 in the PSW 100, in the same way as in the 80C51. The selected bank appears as the general purpose registers. The banks of registers can be addressed as registers or using memory (RAM) address during immediate, direct and indirect address modes. The most significant bits of the address are ignored, like in addressing the SFR space 40, so that each page has the general purpose register mapped into it. When off-chip RAM 20 is mapped outside on-chip RAM 80 range, under microcode program control, any access to this address space will automatically fetch off-chip data, giving the microcontroller 12 a linear address space from 0 to 16 megabytes. Off-chip data memory on page 0 that overlaps the on-chip memory, in the same addressable space, under microcode program code, may only be accessed by indirect addressing.

The bottom 1K bytes 122 of every data memory segment page, under microcode control, is directly addressable data space. This addressing mode contains the low 16 bits of the data address within the instruction. A segment register (SR) associated with the direct address space which forms the upper byte of the 24-bit address is always the data segment (DS) register (see FIG. 7). This built-in protection mechanism prevents user level code, such as 80C51 applications, from switching between direct address spaces in different segments. The 32 bytes 124 of this space at addresses 20 to 3F hex forms the standard bit addressable RAM space (256 bits). In the 80C51 compatibility mode (CM=1) only, the lower 32 bytes 126 of this direct address space overlaps the 32 register bytes of the 80C51 (see FIG. 5). This register block is the same in all pages. In the native mode of the microcontroller 12, all registers are confined to the register file 82 only and do not have any memory association. The direct address space in native mode thus starts from address 0 in data memory. Indirect addresses from any register of the register file are appended to the 8-bit data segment register (DS) or the extra segment register (ES). This segmentation allows for streamlining the encoding and execution of memory indirect access instructions as well as; providing simple segregation of processes, such as 80C51 applications, running under a multi-tasking system during indirect addressing. This mode can address an entire 64k data segment, which may be anywhere in the 16MB address space, depending on the segment register contents. For 80C51 compatibility, indirect addressing through R0 and R1 (registers R0L and R0H) are executed with only 8 bits of the indirect address if the CM flag in the system configuration register is set. Word registers R0–R7 are also used as address pointers during indirect and indirect-offset addressing modes. Word register R7 is the stack pointer, either the system stack pointer or the user stack pointer depending on the whether the microcontroller 12 is in the system or user mode. Word register R6 (byte addressable as R6H and R6L) is used as the data pointer register (DPTR) when in the 80C51 compatibility mode. Byte registers R4L and R4H are used as the accumulator and the P register, respectively, when in the compatibility mode. In the indirect addressing mode the low order 16 bits of the address are taken from any word register in the register file 82. The upper 8 bits are taken from either the data segment (DS) or extra segment (ES) SFR. Under microcode program control, many instructions with indirect addressing allow an option to automatically increment the specified address register after the memory access. The register will be incremented according to the data size: by 1 for a byte operand and when in compatibility mode and by 2 for a word operand. An indirect-offset addressing mode is provided and uses the sum of an address register and an immediate offset value as the effective address of the operand. The offset can be either an 8-bit signed value with a range of +127 to −128 bytes, or a 16-bit signed value with a range of +32767 to −32768 bytes. This potentially provides access to an entire data segment with this mode. In the immediate addressing mode, a constant value is stored within the instruction and is used as the address. Depending on the instruction, the value may be 4-bits, 8-bits, or 16-bits in size.

The special function registers 110 are in the 1K direct address block 139 from address 400 to 7FF hex (see FIG. 6). The first half 140 of this block is the on-chip SFR space. This area of SFRs is used to access SFR mapped registers, and control and data registers for on-chip peripherals and I/Os. The rest 142 is reserved for off-chip SFRs. This allows faster accesses of off-chip memory mapped I/O devices without having to create a pointer for each access. The SFR 139 space is directly addressed as in the 80C51. Although the SFR 139 space uses the same addressing mode as the 1K of directed addressed data space, it is logically a separate space and should not be thought of as overlapping the indirect data space (See FIGS. 5 and 6). The lowest 64 bytes in the SFR address space are the only bit addressable SFR locations. The bit addressable SFR space is assigned to a single block on the microcontroller 12, as opposed to every 8th address as on the 80C51. This allows assignment of bit addressable SFRs that are also word addressable. Because there is only a single SFR space 40 and all 80C51 programs must be given access to the SFR space 40, any direct address to 400 to 7FF hex space of any page virtually maps to the single physical SFR space 40. As a result, RAM memory cannot be directly addressed in this range but must be indirectly addressed. The SFR space 40 is thus page independent and is mapped into all pages of data memory. This also results in the complete address space of the microcontroller exceeding 16 Mb because of this address mapping overlap.

The architecture currently supports RAM space segmentation into 256 pages 120 (FIG. 3) each 64K in size. Memory in the system 10 (FIG. 1) is addressed in units of bytes, each byte consisting of 8-bits. A word is a 16-bit value, consisting of two contiguous bytes. The storage order for data in the microcontroller 12 is "Little Endian" such that the lower byte of a word is stored at the lower address and the higher byte is stored at the next higher address. The external bus 24 can be configured in 8 or 16-bit mode, selected during chip reset. The 8 bit mode is used when running 80C51 applications. Depending on the mode of operation selected, all 16-bit external data accesses could be strictly words (16-bit mode) or bytes from consecutive memory locations (8-bit mode). An external word fetch in 8-bit mode results in 2 separate byte accesses (the result is the same in a single word access if the data is on-chip).

As previously stated, the microcontroller 12 supports at program memory 18 with an addressable space of 16 megabytes. The instruction set includes jumps and calls, some of which operate only on the local code page (64K pages for 80C51 compatibility), some of which can access the entire program memory space, and some of which are register indirect. The size of 80C51 programs is not limited to a 64 Kb page and the programs may reside anywhere within the 16 Mb space. Program memory target addresses referenced by jumps, calls, branches, traps and interrupts, under microcode program control, are word aligned. However, the return address from subroutines or interrupt handlers can be on either odd or even boundaries as described in the Aligned Branch Target application previously mentioned. The address range of relative branches has been extended to +255, -256 bytes (a 9-bit, 2's complement displacement encoded as 8 bits with a word-aligned target address). This allows translated 80C51 code to have branches extend over intervening code that will tend to grow when translated and generally increases the chances of a branch target being in range.

The microcontroller provides a two-level user/supervisor protection mechanism. These are the user or application mode and the system or supervisor mode. In a multitasking environment, tasks in a supervisor level are protected from tasks in the application level. The microcontroller has two stack pointers (in the register file 82) called the system stack pointer (SSP) and the user stack pointer (USP). In multitasking systems, one stack pointer is used for the supervisory system and another for the currently active task, such as an 80C51 application. This helps in the protection mechanism by providing isolation of system software from user applications. The two stack pointers also help to improve the performance of interrupts. If the user stack for a particular application would exceed the space available in the on-chip RAM 80, or on-chip RAM 80 is needed for other time critical purposes (since on-chip RAM 80 is accessed more quickly than off-chip memory 20), the user stack can be put off-chip and the interrupt stack (using the system SP) may be put in on-chip RAM 80. The system stack is always forced to data memory segment 0 (the first 64K bytes of data memory), while the user stack is located on the segment chosen by the DS (data segment) register. The two stack pointers share the same register address. The stack pointer, that will be used at any given time, and that will "appear" in the register file 82, is determined by the system mode bit (SM) in the program status word (PSW) register 44. The microcontroller 12 stack is automatically set via microcode program and address logic control to use the user stack pointer (USP) whenever code is executing in the user or application mode and to use the system stack pointer (SSP) when code is executing in the system mode. The microcontroller 12 begins operation after reset in the system mode using the system stack for pushes, pops, subroutine return addresses, and interrupt return addresses. Many applications, including translated 80C51 programs, may simply operate in this; mode at all times. In the system mode, a program may set up the USP and activate a routine that runs in that mode. In the user mode, all pushes, pops, and subroutine return addresses use the application or user stack. Interrupts, however, will always use the system stack. A user mode program cannot modify the system stack pointer (SSP) or the data segment (DS) register, but instead list instead can only read them. However, both read and write on the extra segment register (ES) are allowed in the user mode. To request use of a different stack or data segment, a user mode program, such as an 80C51 application, has to call a system mode routine via a TRAP instruction, or signal the system code in some other fashion. A system mode routine can manipulate the segment register (or not, if it decides that the application code shouldn't have access to that area) and return to the application code. In this manner, application code tasks may be easily limited to using certain areas of the total data space. System mode code can use the user stack by copying the user stack pointer (USP) to another pointer register and accessing the user stack through the data segment register (DS). Using these mechanisms, the system monitor can prepare the user stack for a task, or easily access parameters on the user stack when it is called by a trap instruction for some system service.

Complete programs generally consist of many different modules or segments. However, at any given time during program execution, only a small subset of a program's segments are actually in use. Generally, this subset will include code and data. The microcontroller 12 architecture takes advantage of this by providing mechanisms to support direct access to the working set of a program's execution environment and access to additional segments on demand. At any given instant, two segments of memory are immediately accessible to an executing program. These are the data segment, where the stack and local variables reside, and the extra segment, which may be used to read remote data structures. Restricting the addressability of software modules helps gain complete control of system resources for efficient, reliable operation in a multi-tasking environment. A current working data segment in the microcontroller consists of a 16-bit address (pointer) and an 8-bit segment. The 8-bit segment registers DS or ES holds the offset which is used to identify this current segment. These segment registers are used as extension to 16-bit pointer registers and stack pointers to allow data to be accessed through the entire 16 megabyte address range. A "byte" register in the SFR space contains bits that are associated with each of the 7 general purpose pointer registers (i.e. not the SP) that selects either DS or ES as the source for the most significant 8-bit for the 24-bit address. This register is called the segment select register or SSEL. The power-on state of the SSEL bits is reset, i.e., it defaults to the DS register. Segment registers are not automatically incremented or decremented along with their associated pointer registers, but must be altered explicitly by instructions. Writes to the data segment register (manipulating the offset in DS) and writes through the extra segment register (manipulating the memory pointed to by ES:Rn) are restricted only to system level code to provide program independence, such as when running several 80C51 programs. However, in user mode or application mode, writes through or using DS, writes to ES, and reads through ES are allowed.

Exceptions and interrupts are events that pre-empt normal instruction processing. Exception and interrupt processing makes the transition from normal instruction execution to execution of a routine that deals with an exception. An exception/interrupt vector includes the address of a routine that handles an exception. Exception/interrupt vectors are contained in a data structure called the vector table, which is located in the first 256 bytes of code memory page 0. All vectors include 2 words which are (i) the address of the exception handler and (ii) the initial PSW contents for the handler. The first instruction of each exception/interrupt handler must be in page 0 of program memory because the address of the handler in the vector table is only 16-bits (page 0). All exceptions and interrupts other than RESET cause the current program counter (PC) and PSW values to be stored on the stack and are serviced after the completion of the current instruction. During an exception or an interrupt, the 24-bit return address and the current PSW word are pushed onto the stack. The stacked PC (hi-byte): PC (lo-word) value is the 24-bit address of the next instruction in the current instruction stream. The program counter (PC) is then loaded with the address of the corresponding handler routine from the vector table and the PSW is then loaded with a new value stored in the upper word of the corresponding vector. Execution of the exception or interrupt handler proceeds until the return from interrupt (RETI) instruction is encountered or by another exception or an interrupt of higher priority. The RETI instruction terminates each handler routine. Under microcode program control this pops the return address from the stack into the PC, reloads the original PSW from the stack and causes the processor to resume execution of the interrupted routine.

There are several ways in which code or instruction addresses may be formed to execute instructions on the microcontroller 12. Changing the program flow is done with simple relative branches, long relative branches, 24-bit jumps and calls, 16-bit jumps and calls, and returns. Code addresses are also calculated to perform table lookups and similar code MOVC functions. Simple relative branches use an 8-bit signed displacement added to the program counter (PC) to generate the new code address. The calculation is accomplished by shifting the 8-bit relative displacement left by one bit (since it is a displacement to a word address), sign extending the result to 24-bits, adding it to the program counter contents, and forcing the least significant bit of the result to zero. The long relative unconditional branch (JMP) and call with 16-bit relative displacements use the same sequence. The branch range is from +255 to −256 for 8-bit relative and from +65535 to −65536 for long jump and call. Far jumps and calls include a 24-bit absolute address in the instruction and simply replace the entire program counter contents with the new value. The address range is anywhere in the 16M address space for the microcontroller 12. Return instructions obtain an address from the stack, which may be either 16 or 24-bits in length, depending on the type of return. A 24-bit address will simply replace the entire program counter value. A 16-bit return address replaces only the bottom 16 bits of the PC. Code addresses can be generated in several different ways. The standard version uses a 16-bit value from a pointer register appended to either the top 8 bits of the program counter (PC) or the code segment (CS) register to form a 24-bit code address. The source for the upper 8 address bits is determined by the setting of the segment selection bit (0=PC and 1=CS) in the SSEL register that corresponds to the pointer register that is used. Note that the CS is an 8-bit SFR like DS and ES. It may be modified only by SFR reads and writes and bears no relationship with the upper 8-bits of the PC. Two other variations are provided for 80C51 compatibility. One operation adds the contents of the 80C51 compatibility register A and DPTR to form a 16-bit value, using the upper 8 bits of the PC to make a complete 24-bit address.

Figure 7:
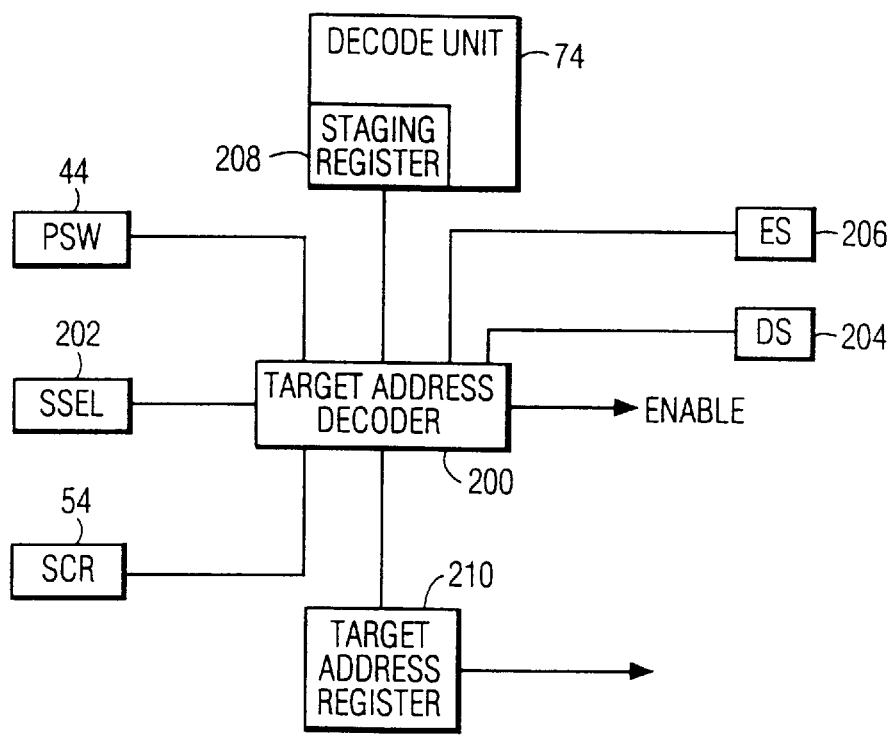
FIG. 7 depicts address mapping logic.

To allow the present invention to swap register banks between applications which are in the compatibility mode and provide the page address mapping previously discussed, a target address logic or decoder 200, as illustrated in FIG. 7, receives the register bank indicator bits (R0 and R1) and the system mode bit (SM) from the program status word (PSW) register 44. The decoder 200 also receives an indication from the segment select register 202 concerning which of the segment registers data 204 or extra 206 are used for address extension. The decoder also receives an indication of the contents of the registers 204 and 206, particularly whether the contents are zero. The SCR register 54 provides the compatibility mode bit to the decoder 200. The decoder 200 receives an indicator from staging register 208 of the decode unit 74 indicating the type of instruction (immediate/direct/indirect) which is being executed and also an indication of which registers, if any, are referenced by an instruction, such as a stack instruction. The target address decoder 200, using a target address from a target address register 210, which is provided to all the units on the chip over the internal bus 86, and information from the other registers and units discussed above, determines the mapping to the designated register bank of the register file 82, the SFR register space 40 and within and outside the particular 64Kb segment associated with an 80C51 procedure and issues an appropriate enable signal.

Multi-tasking using several 80C51 programs can be launched and controlled in a number of different ways. For example, the 80C51 applications can be launched by a system mode program that loads the appropriate registers and then executes a RETI instruction as described in the Fast Context Switching application previously mentioned. Returns to control by the system mode program can be by way of a timer controlled interrupt.

The instruction set for the microcontroller 12 FIG. 1 is preferably a superset of the 80C51 instruction set, that is there preferably are instructions in the set of the microcontroller that have a one for one mapping with instructions of the 80C51. Those of ordinary skill in the art can provide the appropriate microcode programs suitable for executing a 80C51 instruction on the microcontroller described herein. To insure that instruction translation performs properly, the translation needs to ensure that SFR space is correctly addressed. The translation should use register R8 as; the A and ACC registers of the 80C51 code and should use R9 as the 80C51 B register. The stack in the 80C51 is a byte stack while the stack of the microcontroller 12 is a word stack and any operation that depends on stack length must be checked and flagged to the user to insure correctness. The same applies for operations using the stack direction. Jumps that use a jump table must also account for the word versus byte orientations of the microcontroller 12 and 80C51, respectively. Because interrupts require an interrupt vector table in page zero, 80C51 code residing in this location must be moved and the vector must point to this new address. References to the 80C51 byte stack pointer must be translated to refer to the word pointer register of the microcontroller 12. In operations performed directly on the stack pointer the user needs to be flagged to check for code correctness. An appropriate translator can also be provided by those of skill in the art.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An electronic circuit with a microcontroller having an operational mode for running multiple application programs, the circuit comprising:

a register file with a plurality of banks of registers;

a data memory;

address mapping logic;

wherein in the operational mode:

the address mapping logic is operative to truncate a memory address used in a respective one of the programs and to map the truncated address on a respective bank of registers dependent on the truncated address falling in a particular range wherein:

the plurality of banks of registers comprises first banks of general purpose registers and second banks of special function registers;

the address mapping logic is operative to:

truncate the address by ignoring a number of its most significant bits;

mapping a first range of truncated addresses of the data memory used by the respective program into respective ones of the first banks of general purpose registers; and mapping a second range of truncated addresses into respective ones of the second banks of special function registers when direct addressing is employed.

2. The circuit of claim 1, wherein:

the first range is smaller than 1F hex; and the second range lies between 400 hex and 7FF hex.

3. The circuit of claim 2, wherein any of the multiple application programs is a program that is code compatible with a further program for a 80C51-type controller.

* * * * *